Nov. 18, 1969　　　　R. R. DOYLE　　　　3,478,783
THERMALLY INSULATED PIPING SYSTEM
Filed March 27, 1967　　　　　　　　　　2 Sheets-Sheet 1

INVENTOR.
Robert R. Doyle
BY Flehr, Hohbach, Test
Albritton & Herbert
Attorneys

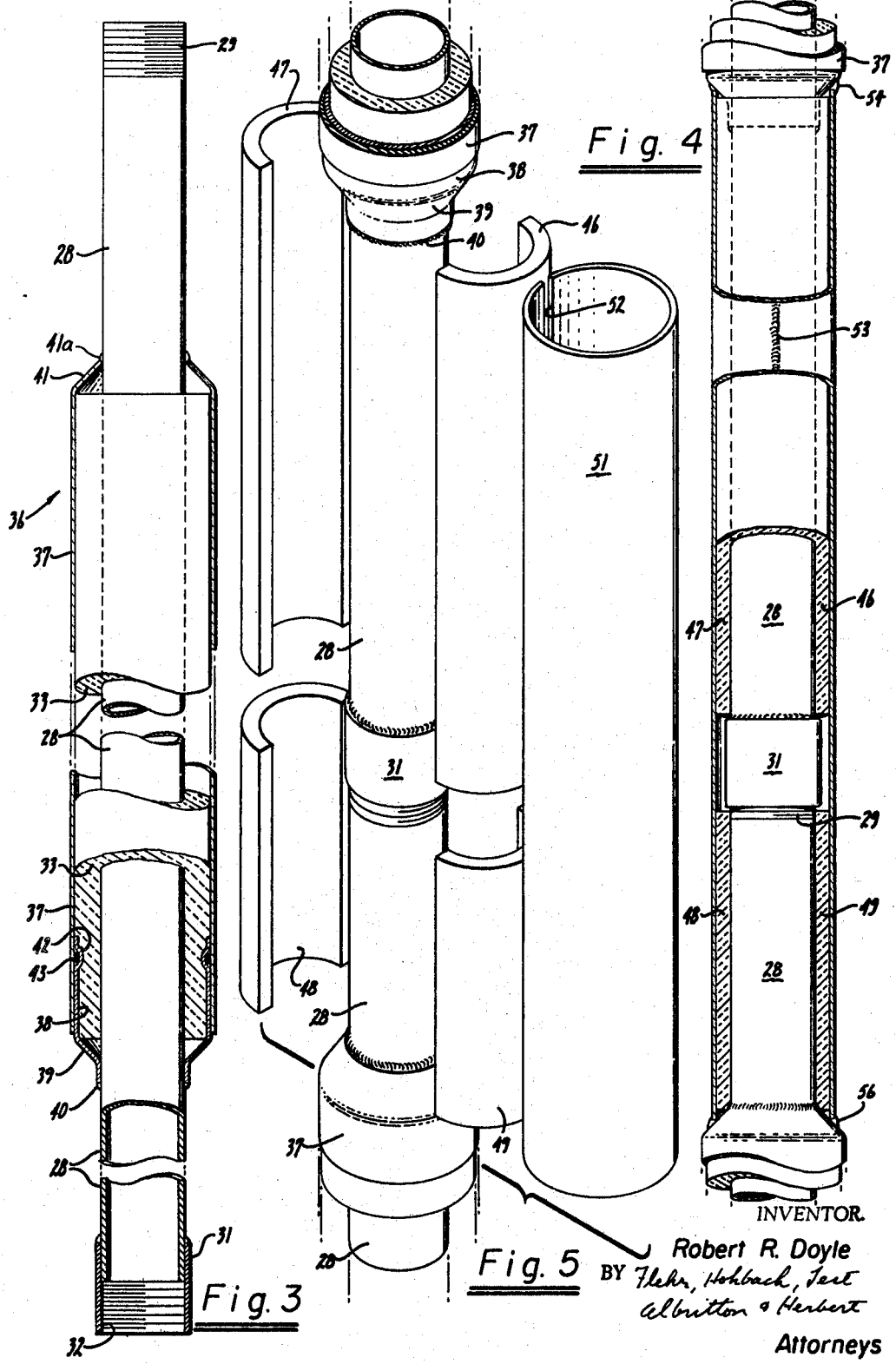

United States Patent Office 3,478,783
Patented Nov. 18, 1969

3,478,783
THERMALLY INSULATED PIPING SYSTEM
Robert Redford Doyle, 1600 N. Mabury,
Santa Ana, Calif. 92701
Filed Mar. 27, 1967, Ser. No. 626,223
Int. Cl. F16l 55/00, 59/16
U.S. Cl. 138—103
9 Claims

ABSTRACT OF THE DISCLOSURE

A plurality of sections of thermally insulated pipe connected together by a thermal coupling. Each piping consists of a length of tubing surrounded by a thermal insulating material and telescoping jacket sections. The jacket sections are welded to the tubing and are provided with a longitudinally freely moving O-ring seal to permit the tubing to expand. The thermally insulated coupling bridges the thermal insulation between adjacent piping sections and consists of a jacket surrounding hemicylindrical shells of insulation material.

---

This invention relates to thermally insulated piping system and more particularly to such a piping system for use in the steam treatment of underground oil wells to improve the flow of oil crude from the formation.

The recent practice of injecting steam into producing oil wells to improve the flow of oil crudes is subject to the problem of getting the steam down to the formation to be treated without losing so much heat as to result in an unreasonably long steam cycling time. Another problem relates to the losses of heat by radiation and convection to the well casing and associated concrete structure. Heretofore, the heat lost to the well casing and structure has been so great as to cause the same to expand several feet out of the ground during the steaming operation, creating inconvenient operating conditions and possible structural failure of the well casing and permanent damage to the hole upon later contraction. There is, therefore, a need for a new and improved piping system for oil well steam injection.

In general, it is an object of this invention to provide an improved thermally insulated piping system for use in steam injection in oil wells which will overcome the above-named limitations and disadvantages.

Another object of the invention is to provide a piping system of the above character in which heat loss from the piping system is reduced to a relatively harmless level and in which the steam delivered to the formation to be treated contains a proportionately higher heat content.

Another object of the invention is to provide a piping system of the above character constructed from a small number of parts which can be easily assembled at the well site into a continuous, hermetically sealed run of pipe.

Another object of the invention is to provide a piping system of the above character which is durable in construction so as to withstand rough handling typical of that applied to oil field equipment.

These and other objects of the invention will become apparent in the following description in which a preferred embodiment thereof is set forth in detail in conjunction with the accompanying drawings.

Referring to the drawings:

FIGURE 3 is a longitudinal cross sectional view of one section of the piping system with certain parts broken away showing details of the construction.

FIGURE 4 is a cross sectional view of the thermal coupling connection between sections of pipings with certain portions broken away to illustrate the interior construction.

FIGURE 5 is an exploded view of the thermal coupling connection of FIGURE 4 showing the manner in which the coupling connection is assembled.

Figure 1:
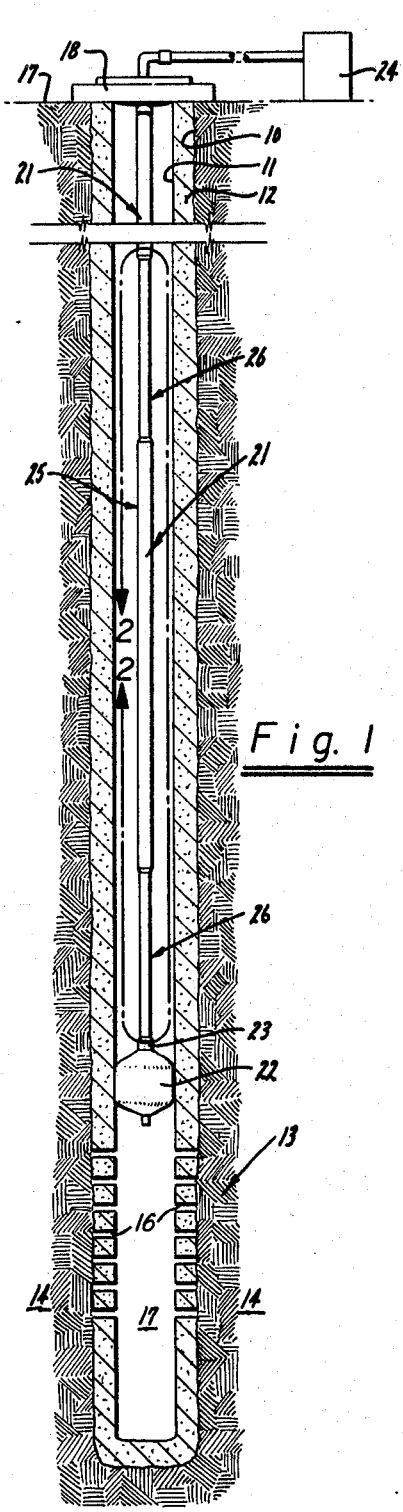
FIGURE 1 is a schematic view in cross section showing a manner of insulation of a completed piping system constructed according to the invention.

Referring generally to FIGURE 1, there is shown an oil well hole 10 into which extends a casing 11 cemented in place by concrete 12 in a conventional manner. The lower end 13 of the well and casing extends into an oil bearing formation or strata 14 and is given a plurality of perforations 16 to provide communication between the strata 14 and the interior 17 at the lower end of the well. The well head 17 at ground level is sealed off with a suitable casing or packing flange 18. The piping system 21 of the invention extends from the flange 18 down the well hole to a predetermined depth and is commonly terminated by a packer 22 which is sealed against the inside of casing 11 and is equipped with an inwardly extending tubing 23 to which piping system 21 is connected. The piping system may terminate at flange 18, but is preferably continued to a steam generator, diagrammatically shown at 24.

Figure 2:
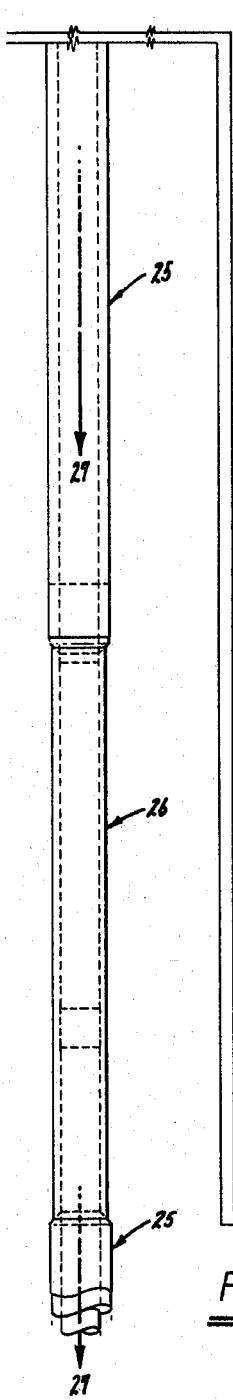
FIGURE 2 is an enlarged view of that portion of the piping system of FIGURE 1 which is enclosed in the lines 2—2.

Piping system 21 includes a plurality of piping sections 25 interconnected by coupling connectors 26 into a continuous run as shown in FIGURE 2. The sections 25 are arranged end to end to form a continuous conduit 27 for the steam being transported.

The details of the construction of the elements of the piping system are shown in FIGURES 3 through 5. Referring particularly to FIGURE 3, there is shown one section 25 of piping, consisting of a length of tubing 28, one end 29 of which is threaded and is considered to be the uppermost end of the section. The other end is provided with a coupling box 31 having internal threads for receiving the upper end 29′ of the next adjacent section. Typically, oil well tubing 28 is conveniently provided in 30 feet lengths and is about 2–4 inches in diameter.

Substantially, the entire length of tubing 28 is surrounded by a thermal insulation material 33 which is preferably in the form of molded cylindrical shells. A suitable insulation material is hydrous calcium silicate combined with asbestos fiber and available from Johns-Manville Sales Corp. under the trademark Thermobestos. Such material is capable to use up to temperatures of 1,200° F. and has a low conductivity such that a temperature differential 600° F. to 167° F. through a thickness of 1 inch.

Jacket means 36 is provided to surround and support the insulation material 33. The jacket means 36 comprises telescoping tubular sections 37, 38, section 38 being of slightly smaller diameter that it can slide within section 37. One end of section 38 is cold formed down to form a shoulder and a region or nipple 39 slightly larger than tubing 28 to which it is welded at 40. Tubular section 37 extends to major length of the pipe and surrounds insulation 33. Section 37 is also cold formed inwardly to form a shoulder terminating in a region 41 of smaller diameter and is welded at 41a to the tubing 28. Tubular sections 37, 38 are formed of any suitable self-supporting rigid material such as 14 gauge steel piping.

Inner tubing 38 is provided with an annular recess 42 at its upper end for receiving an O-ring gasket 43 and supporting the same in a position between sections 37, 38 to form a longitudinal slip joint. This allows the jacket sections to expand with the expanding tubular section but maintains a sealed relationship between the tubular sections so as not to allow penetration of oil or water to contaminate the space between a jacket means and tubing 28.

The assembly of jacket means 36 and insulation 33, onto the tubing is straightforward and relatively easily and rapidly carried out. Thus, section 38 together with as many sections or units of insulation as desired may be slid over the tubing 28 from end 29 until properly positioned after which jacket section 37 is slid over and downwardly until it fully encloses the insulation material and assumes the configuration shown in FIGURE 3. At this time, seam welds 40, 42 are made and the unit is complete for shipment to an oil field site together with the coupling connections, hereinafter described.

FIGURE 4 shows a thermally insulated coupling connection 26 between adjacent sections 25 of piping in detail. In a typical oil field installation a section of piping would be raised and lowered over the last installed piece on which it would be turned until the box end 32 of one member and the threaded end 29 of the next lower member were firmly joined after which the connection 26 would be assembled. Connection 26 consists of hemicylindrical shells 46–49 of insulation material similar to insulation material 33 and are positioned to surround the otherwise exposed section of tubing between the jacket means of the adjacent piping sections. The shells of insulating material 46–49 are held in place by a snap-lock jacket 51 which can be sprung opened along a longitudinal slit 52, placed over the shells and closed. Jacket 51 is sealed along its seam 52 and at each end to the respective jacket means at 54, 56 by a heat and oil resistant sealant 53 such as that marketed by Minnesota Mining & Manufacturing Company, under the designation EC 750. As will be noted, the diameter of jacket 51 is made somewhat smaller than the outer diameter of the jacket means 36 so that the former abuts the shoulders 39, 41 of adjacent sections 25. This arrangement creates a compressive seal between the jacket 51 and the adjacent jacket means. After each making up of coupling connection 26, the piping system is lowered and the next section of piping installed in a like manner until the desired length of piping has been built up.

The following specifications serve to illustrate a particular application of the piping system of the invention to a system designed to transport 600° F. steam down an oil casing having a minimum inner diameter of 5⅝ inches:

| | |
|---|---|
| Tubing 28 | 2⅞ inches O.D. 30 feet long. |
| Jacket section 36 | 4½ inches O.D. 14 gauge. |
| Overall diameter of the insulated and jacketed pipe | 4½ inches O.D. |
| Insulation | ¾ inch thick. |
| Coupling jacket 51 | .020 inch galvanized steel. |
| Steam temperature | 600° F. |
| Outside jacket temperature | 195° F. |
| Overall expansion | 1½ inches per section. |
| Time required to install thermal coupling connection at well head | 3–5 minutes. |

Using the piping system of the invention, it is possible to maintain 190° F. to 200° F. readings on the surface of the jacket 36 during a 14 day steam cycle in which steam from 600° F. to 700° F. is being injected into the well. It is found that the significant reduction in expansion and recesses in the well casing and associated structure results. The reduction is sufficient to avoid problems heretofore associated with such steam injection systems.

From the above it will be apparent that the new pipe system of the invention is of great value in facilitating the steam injection process and oil recovery operations. The system of the invention solves serious heat loss problems and avoids serious expansion of the well casing. The increased heat content of the delivered steam at the bottom of the hole results in a significant saving of steam generator time, of the fuel used in operating the generator, and in the capital investment in steam generating equipment. In connection with the required capital investment it is now possible to steam more wells with a given capacity steam generating plant. Furthermore, the handling, assembly, and disassembly of the piping system of the invention is not significantly more complicated than of conventional tubing. Furthermore, the simplicity of construction keeps the increased cost of the piping system at a minimum.

To those skilled in the art to which this invention relates many changes in procedures and differing embodiments and applications of the invention will suggest themselves without departing from its spirit and scope. For example, with high temperatures and possibly even at 600° F. it would be of value to apply a reflective intercoating on the tubular sections 37, 38 to aid in reducing heat loss. And, various modifications can be made to jacket 51 to secure it about the insulation 46–49 without requiring a snap-lock arrangement. It can, for example, be banded at spaced locations therealong by conventional banding equipment. Accordingly, it should be understood that the disclosure and specifications herein are illustrative of the invention and are not to be taken as limiting.

I claim:

1. In a thermally insulated piping system for injecting hot fluid into an underground well, a plurality of sections of piping connected together, each section of piping comprising a length of tubing serving as a conduit for said hot fluid, a thermal insulation material surrounding substantially all of the length of said tubing, jacket means surrounding said insulation, said insulation extending between the tubing and the jacket means so that said jacket means serves to laterally support said insulation, means associated with said jacket means for providing a hermetic seal at each end thereof between the jacket means and the tubing, said jacket means further including a joint for permitting longitudinal contraction and extension thereof to thereby permit the tubing to freely contract and expand as it is heated and cooled by the temperature of the fluid being transported, means associated with said joint for forming a sealed relationship therein for preventing penetration of contaminants through said joint and into said insulation.

2. The piping system as in claim 1 in which said jacket means includes first and second tubular sections telescoped over each other, and a high temperature seal disposed between said sections, said seal being constructed and arranged to permit longitudinal movement of the telescoped sections relative to each other as the tubing expands and contracts.

3. The piping system as in claim 2 wherein said seal comprises a high temperature O-ring gasket disposed between the tubular sections and wherein one of said tubular sections is provided with an annular recess for receiving said gasket.

4. The piping system as in claim 3 wherein said one section is provided with an outwardly facing angular recess for receiving and mounting said O-ring gasket.

5. The piping system as in claim 2 wherein each of said sections of piping is adapted for vertical positioning, the uppermost tubular section of said jacket means being dimensioned slightly larger than the lower tubular section and of sufficient length to overlap the exterior of said lower section so that fluid will not flow into the interior of said tubular sections under gravity.

6. The piping system as in claim 1 wherein said insulating material is in the form of molded hollow cylinders.

7. The piping system as in claim 1 in which the insulation material is principally composed of hydrous calcium silicate and asbestos fiber.

8. In a thermally insulated piping system for injecting hot fluid into an underground well, a plurality of sections of piping connected together, each section of piping comprising a length of tubing serving as a conduit for the fluid, a thermal insulation material surrounding a substantial length of said tubing, jacket means surrounding said insulation and supporting the same, said jacket means being sealed to said tubing near each end thereof so as to hermetically seal the insulation between the jacket means and the tubing, said jacket means being constructed so that it is longitudinally extensible to thereby permit the tubing to freely contract and expand as it is heated and cooled from being subjected to the temperature of the fluid being transported, and a thermal coupling connection bridging the jacket means of adjacent sections of piping.

9. The piping system as in claim 8 in which the coupling connection comprises a plurality of cylindrical shells of insulation material and a jacket having a longitudinal slit adapted to be opened to permit the jacket to slip over the shells, said jacket having a length sufficient to span the distance between adjacent jacket means, means for sealing the longitudinal slit and for sealing the ends of the jacket to the respective jacket means.

References Cited

UNITED STATES PATENTS

| | | | |
|---|---|---|---|
| 2,820,480 | 1/1958 | O'Rourke et al. | 138—151 |
| 3,113,595 | 12/1963 | Cotman | 138—113 |
| 3,222,094 | 12/1965 | Robinson et al. | 285—347 X |
| 3,282,611 | 11/1966 | Pierazzuoli | 285—45 |

FOREIGN PATENTS 571,662    3/1959    Canada.

MERVIN STEIN, Primary Examiner

U.S. Cl. X.R.

285—47